J. M. WHITWORTH.
LUBRICATOR FOR SPINDLE SKEINS.
APPLICATION FILED JAN. 31, 1914.
1,107,469.
Patented Aug. 18, 1914.
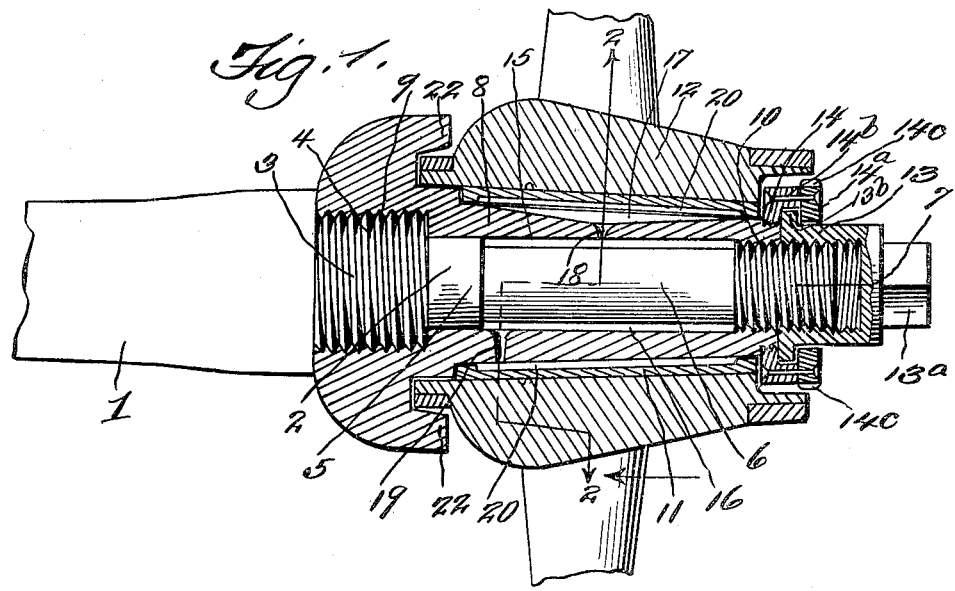
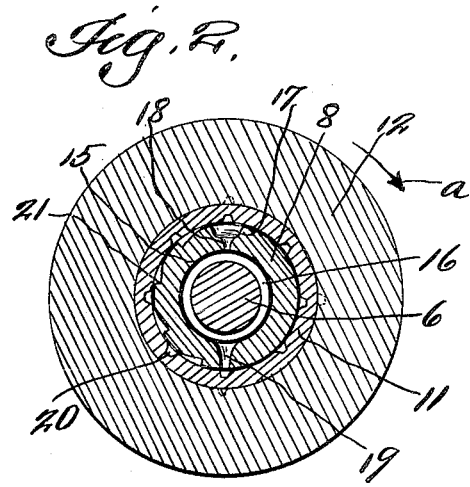
Inventor
J. M. Whitworth,
By D. Swift &C.,
his Attorneys

UNITED STATES PATENT OFFICE.

JOHN M. WHITWORTH, OF KORN, OKLAHOMA.

LUBRICATOR FOR SPINDLE-SKEINS.

1,107,469.      Specification of Letters Patent.      Patented Aug. 18, 1914.

Application filed January 31, 1914. Serial No. 815,642.

*To all whom it may concern:*

Be it known that I, JOHN M. WHITWORTH, a citizen of the United States, residing at Korn, in the county of Washita and State of Oklahoma, have invented a new and useful Lubricator for Spindle-Skeins; and I do hereby declare the following to be a full, clear, and exact description of the invention, such as will enable others skilled in the art to which it appertains to make and use the same.

This invention relates to new and useful improvements in a lubricator for a skein of an axle spindle, whereby the wheel may be kept well lubricated.

One of the features of the invention is to provide an annular chamber between the axle spindle and the skein (which is threaded on the spindle, and locked thereon against rotation, regardless of which way the wheel is turned) and which skein is provided with axially arranged grooves on one side to return the lubricant back to the chamber. In other words the skein is provided with a pocket upon its upper circumference having an opening, so that the lubricant will flow from the pocket to the annular chamber. The lubricant then flows from the annular chamber through an opening in the lower circumference of the skein at one end of the chamber, so as to reach the inner circumference or cylindrical bore of the bushing of the hub of the wheel. As the lubricant reaches the inner circumference or bore of the bushing of the hub of the wheel, it is picked up or carried back to the pocket, by means of the axially arranged grooves of the bushing and by the axially arranged grooves upon one cylindrical side of the skein. By examining Figure 2 of the drawings and noting the direction of rotation of the hub indicated by the arrow $a$, it will be clearly understood how the lubricant is returned to said pocket.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings: Fig. 1 is a vertical sectional view through a skein mounted upon an axle spindle, showing a hub of a wheel upon the skein. Fig. 2 is a sectional view on line 2—2 of Fig. 1.

Referring more particularly to the drawings, 1 designates a portion of an axle having a spindle 2, the enlarged portion 3 of which is provided with right-hand screw threads 4, while the reduced portion 5 of the spindle is constructed with an annular channel 6, and beyond the channel 6, the end of the spindle is provided with right-hand screw threads 7. The spindle skein 8 at one end is provided with an enlarged threaded bore portion 9 to engage the threads 4 of the spindle. The skein at its other end upon its inner circumference is provided with threads 10 to engage the threads 7 of the spindle. It will be seen that owing to the right-hand threads 4 and 7, the skein will screw tighter upon the spindle, as the hub rotates in the direction of the arrow $a$. In other words, the frictional engagement between the inner circumference of the bushing 11 of the hub 12 of the wheel will tend to screw the skein tighter upon the spindle. Also threaded upon the threads 7 is a lock nut 13 to prevent the skein from unscrewing in case the wheel hub rotates in an opposite direction. To prevent the hub as well as the hub bushing from frictionally contacting with the lock nut (which would tend to unscrew the lock nut) a washer 14 is threaded upon one end of the skein by left-hand threads, which washer would screw tighter upon the skein, in case the wheel hub should be rotated in a direction reverse to that indicated by the arrow $a$. However, as the wheel hub rotates in the direction of the arrow $a$, the tendency is to unscrew the washer 14, but this is prevented owing to the same contacting with the lock nut 13, which is threaded upon the spindle by right-hand threads, and the more frictional contact between the washer and the nut 13, the tighter the lock nut 13 will become. The lock nut 13 is swiveled to the washer 14 by the annular ring plate $14^a$, which is riveted to the washer 14 by the rivets $14^b$. Said plate $14^a$ is provided with lugs $14^c$ to be engaged by a spanner or other suitable device (not shown), whereby the washer may be removed, that is, a little at a time. The lock nut is provided with a rectangular head $13^a$ to receive a wrench or the like (not shown) for removing the lock nut. The lock nut is unscrewed until its flange $13^b$ contacts with the plate $14^a$, then the washer is unscrewed a little until it contacts with the flange $13^b$ again, then the lock nut is unscrewed a little, and then the washer. This is continued until the washer is entirely disengaged from the threads of the skein. In this manner the washer and lock nut are removed.

The inner circumference of the skein between the threads 9 and 10 surrounds the annular channel 6, thereby forming a lubricant chamber 16. The upper circumference of the skein is provided with a pocket 17 to first receive the lubricant from the oil can, which lubricant passes from the pocket 17 through the opening 18 into the chamber 16. The lubricant then reaches the inner circumference or bore of the bushing 11 of the hub, by way of the opening 19 thereby thoroughly lubricating. As the wheel hub rotates, the lubricant is picked up or carried back to the pocket 17, by means of the axially arranged grooves 20 of the bushing 11, and also by the axially arranged grooves or notches 21 on one cylindrical side of the skein, that is, as the wheel rotates in the direction of the arrow *a*. The skein is provided with a guard flange 22 adapted to overlie or overhang one end of the hub 12, to prevent dust or other foreign matter, such as grit or the like reaching the inner circumference of the bushing.

The invention having been set forth, what is claimed as new and useful is:—

1. In a device as set forth, an axle spindle having a channel, a skein secured on the spindle and surrounding the channel which constitutes a lubricant chamber, the upper circumference of the skein having a pocket and provided with an opening leading from the pocket to the lubricant chamber, the lower circumferential wall of the skein having an opening leading from the lubricant chamber to the inner circumference of a wheel hub, said skein having upon one of its cylindrical sides a series of axially arranged grooves adapted to assist in returning the lubricant to the pocket.

2. In a device as set forth, an axle spindle having a channel, a skein secured on the spindle and surrounding the channel which constitutes a lubricant chamber, the upper circumference of the skein having a pocket and provided with an opening leading from the pocket to the lubricant chamber, the lower circumferential wall of the skein having an opening leading from the lubricant chamber to the inner circumference of a wheel hub, said skein having upon one of its cylindrical sides a series of axially arranged grooves adapted to assist in returning the lubricant to the pocket, and axially arranged grooves upon the inner circumference of the wheel hub bushing to coöperate with the first grooves to assist in returning the lubricant to the pocket.

3. In a device as set forth, an axle spindle having a channel, a skein secured on the spindle and surrounding the channel which constitutes a lubricant chamber, the upper circumference of the skein having a pocket and provided with an opening leading from the pocket to the lubricant chamber, the lower circumferential wall of the skein having an opening leading from the lubricant chamber to the inner circumference of a wheel hub, said skein having upon one of its cylindrical sides a series of axially arranged grooves adapted to assist in returning the lubricant to the pocket, and axially arranged grooves upon the inner circumference of the wheel hub bushing to coöperate with the first grooves to assist in returning the lubricant to the pocket.

In testimony whereof I have signed my name to this specification in the presence of two subscribing witnesses.

JOHN M. WHITWORTH.

Witnesses:
S. K. WAUCHOPE,
THOMAS K. KOOP.

Copies of this patent may be obtained for five cents each, by addressing the "Commissioner of Patents, Washington, D. C."